United States Patent
Landon et al.

(10) Patent No.: US 9,350,400 B1
(45) Date of Patent: May 24, 2016

(54) UNEQUAL RATE INTERFERENCE CANCELLATION

(71) Applicant: L-3 Communications Corp., New York, NY (US)

(72) Inventors: David G. Landon, Bountiful, UT (US); Osama S. Haddadin, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/850,847

(22) Filed: Sep. 10, 2015

(51) Int. Cl.
*H04L 27/06* (2006.01)
*H04B 1/10* (2006.01)
*H04L 1/00* (2006.01)

(52) U.S. Cl.
CPC ............ *H04B 1/1027* (2013.01); *H04L 1/0091* (2013.01); *H04B 2001/1045* (2013.01)

(58) Field of Classification Search
CPC .......................... H04L 25/067; H04L 1/0045
USPC ............................. 375/340, 224; 342/159, 165
See application file for complete search history.

(56) References Cited

U.S. PATENT DOCUMENTS 5,099,493 A * 3/1992 Zeger ........................ H04L 5/02
370/206
2012/0027066 A1* 2/2012 O'Keeffe ............... H01Q 1/246
375/224

OTHER PUBLICATIONS

Henry V. Bazak, Jr., A Simple Depolarization Compensator for Very Wideband Communications Links—An Experimental Evaluation, IEEE Transactions on Communications, vol. 42, No. 5, May 1994.
Christian Schlegel, Optimal Power/Rate Allocation and Code Selection for Iterative Joint Detection of Coded Random CDMA, IEEE Transactions of Information Theory. Sep. 2006.

* cited by examiner

*Primary Examiner* — Khai Tran
(74) *Attorney, Agent, or Firm* — Workman Nydegger

(57) ABSTRACT

A method for receiving and removing co-channel interference from one or more received signals that comprise different symbol or chipping rates can comprise receiving a first composite signal and a second composite signal. The method can also comprise sampling the first composite signal and the second composite signal at a particular sampling rate that is sufficient to recover signal data from both the first composite signal and the second composite signal. Further, the method can comprise estimating from the second composite signal an estimated cross-coupled second signal within the first composite signal. The estimated cross-coupled second signal is estimated from at least the second composite signal at the particular sampling rate. Further still, the method can comprise recovering a substantially decoupled first data signal by removing at least a portion of the co-channel interference caused by the estimated cross-coupled second signal from the composite first signal.

22 Claims, 4 Drawing Sheets

UNEQUAL RATE INTERFERENCE CANCELLATION

BACKGROUND OF THE INVENTION

1. Technical Field

The present invention relates generally to digital signal processing.

2. Background and Relevant Art

Digital communication and signal processing have become ubiquitous in the modern world. In particular, over-the-air communication via cellular phones, Wi-Fi connections, and other similar communication devices has experienced an explosion in bandwidth requirements and usage in recent years. This increase in bandwidth utilization has resulted in significant innovations within the area of communication technologies.

A variety of different methods are used to optimize bandwidth within particular frequency bands. For example, cross-polarization of signals can be used to effectively double the bandwidth of a particular frequency channel. Cross-polarized signals can be transmitted within the same frequency band, but at distinguishably different polarizations. A receiver can receive both signals within the same frequency band and filter the signals from each based upon the difference in polarization. For instance, a first signal may be transmitted at a vertical polarization and a second signal transmitted at a horizontal polarization. The receiver can separate the signal data in the vertical polarization from the signal data in the horizontal polarization. As such, the receiver can simultaneously receive two different signals within a single frequency band.

One of skill in the art will recognize that while cross-polarization can provide significant benefits for transmitted signals, potential drawbacks can also arise. For example, cross-channel interference between cross-polarized signals can corrupt the data in each respective signal. Co-channel interference arises when signal information at a particular polarization (e.g., the vertical polarization) is smeared into the signal information within another polarization (e.g., the horizontal polarization). If the co-channel interference is significant enough, data loss from one or both of the signals can occur.

To address co-channel interference, various methods of cross-polarization interference cancellation ("CPIC") are used within conventional digital signal processing systems. Fortunately for CPIC, in many cases, the cross-polarized signals are broadcasted from the same source, which can aid in syncing the respective signal rates. In particular, conventional cross-polarization signals are broadcast at the same symbol and/or chipping rates. The common symbol and/or chipping rate is crucial within the conventional art for properly retrieving the respective data signals.

In addition to co-channel interference caused by cross-polarized signals, co-channel interference can also arise in other signal processing contexts. For example, a digital signal processing system with directional antennas that are receiving different signals from different directions, but within the same frequency band, can also experience co-channel interference. Similar to cross-polarization interference, the directional signals can interfere with each other and introduce interference to the data of interest.

Several methods are known in the art for removing co-channel interference from signals of interest. Conventional systems, however, rely upon the underlying signal having equal symbol and/or chipping rates in order to isolate and remove the co-channel interference. Accordingly, there are a number of problems within the art relating to processing signals with co-channel interference, when the underlying signals comprise different symbol and/or chipping rates.

BRIEF SUMMARY OF THE INVENTION

Implementations of the present invention comprise systems, methods, and apparatus configured to remove co-channel interference from one or more received signals that comprise different symbol or chipping rates. In particular, implementations of the present invention comprise computer systems, methods, and computer-readable media for receiving one or more co-channel signals transmitted at different rates, identifying co-channel interference caused by at least one of the signals, and removing the identified co-channel interference from the other signal. As such, implementations of the present invention provide significant benefits within multiple digital communication fields, including communication fields that deal with cross-polarization interference, multi-directional signals, and other fields that may experience co-channel interference.

For example, a method in accordance with at least one implementation for receiving and removing co-channel interference from one or more received signals that comprise different symbol or chipping rates can include receiving a first composite signal and a second composite signal. The first composite signal can comprise a primary first data signal and a cross-coupled second signal. The first composite signal and the second composite signal may share the same frequency band causing co-channel interference; however, the first composite signal and the second composite signal may comprise constituent signals of different chipping or symbol rates.

The method can also comprise sampling the first composite signal and the second composite signal at a particular sampling rate that is sufficient to recover signal data from both the first composite signal and the second composite signal. The method can further comprise estimating from the second composite signal an estimated cross-coupled second signal within the first composite signal. The estimated cross-coupled second signal can be estimated from at least the second composite signal at the particular sampling rate. The method can also comprise recovering a substantially decoupled first data signal by removing at least a portion of the co-channel interference caused by the estimated cross-coupled second signal from the composite first signal.

In an additional or alternative implementation of the present invention, a system configured to remove co-channel interference from one or more received signals that are comprised of different symbol or chipping rates can include computer-executable instructions that are configured to receive a first composite signal and a second composite signal. The first composite signal may comprise a primary first data signal and a cross-coupled second signal. The first composite signal and the second composite signal may share the same frequency band causing co-channel interference; however, the first composite signal and the second composite signal may comprise different chipping or symbol rates.

Additionally, the system may be configured to sample the first composite signal and the second composite signal at a particular sampling rate that is sufficient to recover signal data from both of the first composite signal and the second composite signal. The system may then estimate from the second composite signal an estimated cross-coupled second signal within the first composite signal. The estimated cross-coupled second signal may be estimated from at least the second composite signal at the particular sampling rate.

The system may also be configured to recover a substantially decoupled first data signal by removing at least a portion of the co-channel interference caused by the estimated cross-coupled second signal from the composite first signal. In addition, the system may be configured to generate a recovered first data signal from the substantially decoupled first data signal by estimating individual symbols within the substantially decoupled first data signal. Further, the system may be configured to calculate a first signal error based upon the difference between the recovered first data signal and the substantially decoupled first data signal. Further still, the system may be configured to utilize the first signal error within a feedback system to adjust a first signal filter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
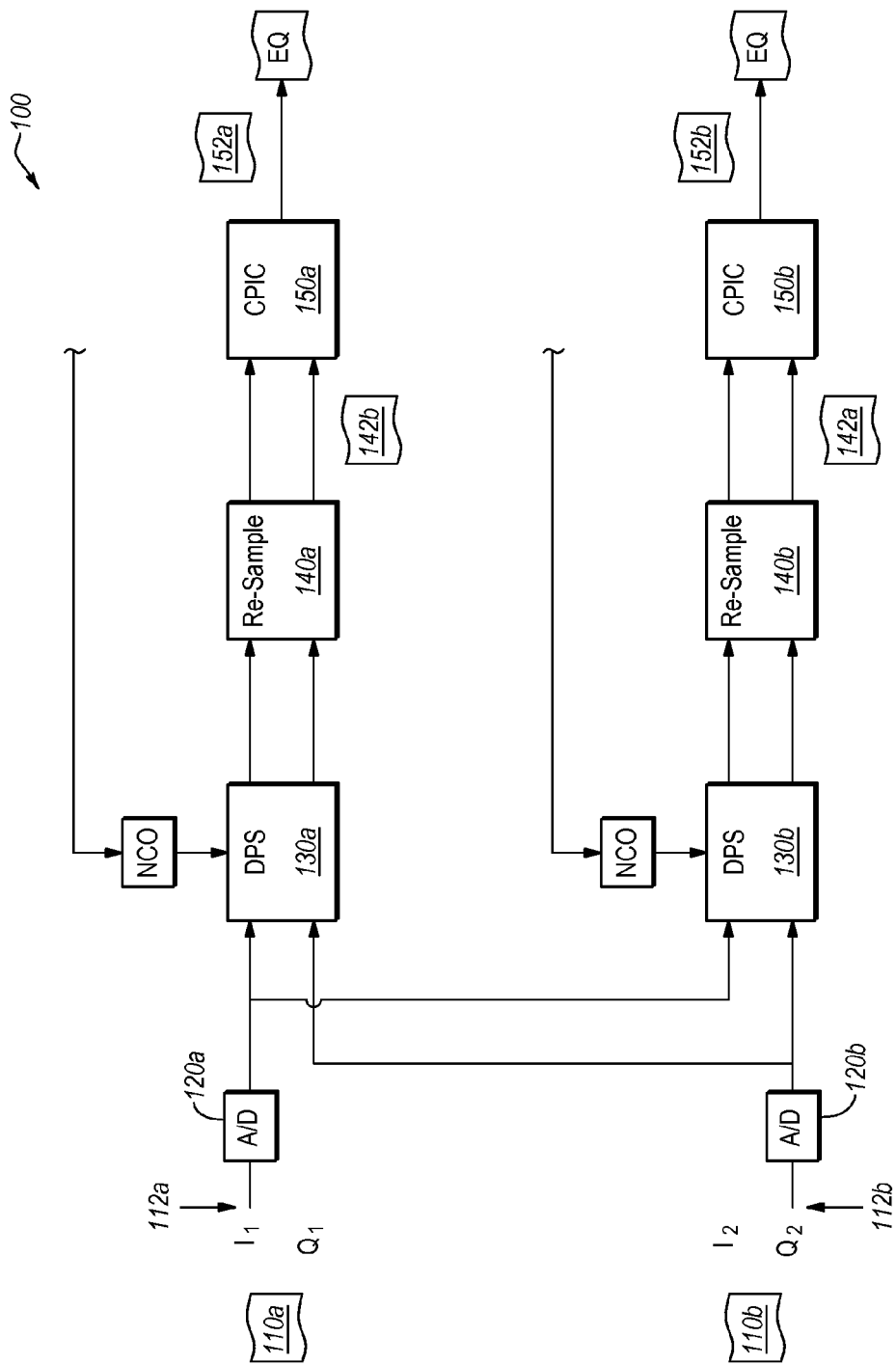
FIG. 1 illustrates a schematic diagram of a digital signal processing system in accordance with implementations of the present invention.

The present invention extends to systems, methods, and apparatus configured to remove co-channel interference from one or more received signals that comprise different symbol or chipping rates. In particular, implementations of the present invention comprise computer systems, methods, and computer-readable media for receiving one or more co-channel signals transmitted at different rates, identifying co-channel interference caused by at least one of the signals, and removing the identified co-channel interference from the other signal. As such, implementations of the present invention provide significant benefits within multiple digital communication fields, including communication fields that deal with cross-polarization interference, multi-directional signals, and other fields that may experience co-channel interference.

Accordingly, implementations of the present invention efficiently remove co-channel interference that is at a different symbol rate or chipping rate than the data signal of interest. One of skill in the art will understand the benefits that can be realized by decoupling multiple signals from each other, when the signals are at different frequencies within the same channel. Conventional signal processing techniques rely upon co-channel signals comprising the same symbol and/or chipping rate. While some situations allow the broadcast signals to be rate matched, various implementations of the communications systems may receive co-channel signals that are transmitted at different rates.

For example, it may be desirable to broadcast two perpendicularly polarized signals, where the first signal comprises a high bandwidth video signal and the second signal comprises a low bandwidth data signal. The high bandwidth video signal may comprise a significantly higher symbol and/or chipping rate than the low bandwidth data signal. During transmission various components of each respective signal can smear into the other. For instance, portions of the low bandwidth data signal may cause a form of co-channel interference known as cross-polarization interference within the high bandwidth video signal.

The difference in symbol and/or chipping rates of the respective signals creates issues that conventional digital signal processing systems are unable to effectively address. For example, a conventional CPIC system may decimate information within one of the signals prior to removing co-channel interference caused by the signal. In at least one implementation, decimating a signal may destroy information that would be beneficial for estimating the co-channel interference caused by a signal. As discussed above, conventional systems are unable to properly address these situations because they are built with an underlying assumption that co-channel signals comprise the same symbol and/or chipping rate. As such, conventional co-channel interference cancellation systems are ineffective or inefficient at removing co-channel interference when the co-channel signals comprise different rates.

Implementations of the present invention can provide significant improvements to a variety of different communication systems. For example, directional antennas that are receiving different signals from different directions may receive signals within the same frequency band but at different symbol or chipping rates. Similarly, closely spaced frequencies bands can experience some co-channel interference due to signal side-lobes. Implementations of the present invention can provide significant improvements to fields that experience co-channel interference—where the underlying signals comprise different symbol rates or chipping rates.

For example, FIG. 1 depicts an implementation of a digital signal processing system 100. The system can be configured for receiving and removing co-channel interference from one or more received signals that comprise different symbol or chipping rates. The system 100 may comprise a first input branch 112*a* that is configured to receive and process a first composite signal 110*a* and a second input branch 112*b* that is configured to receive and process a second composite signal 110*b*. In at least one implementation, the first input branch 112*a* may be configured to receive and process a vertical polarization of a received signal and the second input branch 112*b* may be configured to receive and process a horizontal polarization of a received signal. One will understand, however, that the use of a polarized signal is merely exemplary and that any other co-channel signals can also be used within implementations of the present invention.

In at least one implementation, the first composite signal 110a comprises a primary first data signal and a cross-coupled second signal. The primary first data signal may comprise the portion of the first composite signal 110a that contains the data of interest. In contrast, the cross-coupled second signal may comprise cross-polarization interference introduced by the second composite signal 110b into the first composite signal 110a through co-channel interference. One will understand that additional signal components (e.g., noise) may exists within the first composite signal 110a, however, for the sake of clarity, the present disclosure will focus on the primary data signal and the cross-coupled second signal as the components of interest within the first composite signal 110a.

As disclosed above, in at least one implementation, the first composite signal 110a and the second composite signal 110b share the same frequency band. One of skill in the art will understand that in at least some situations, the second composite signal 110b may cause co-channel interference within the first composite signal 110a. Despite sharing the same frequency band, in at least one implementation, the first composite signal 110a and the second composite signal 110b may comprise different chipping or symbol rates.

Once the first composite signal 110a and the second composite signal 110b have been received, in at least one implementation, the digital signal processing system 100 can sample both signals at the same rate. For example, a first analog-to-digital convert 120a can sample the first composite signal 110a at a particular rate, while a second analog-to-digital convert 120b can sample the second composite signal 110b at the same particular rate. The particular rate may comprise a rate that is high enough to recover signal data from both the first composite signal and the second composite signal. In various implementations, the particular rate may not be the rate that the respective signals are originally sampled, but may instead comprise a common rate of sampling that is applied to both signals after the signals were received by before removing estimated co-channel interference.

In at least one implementation, the particular rate may comprise a rate that is equal to the higher of the Nyquist rate of the primary first data signal or the Nyquist rate of a primary second data signal. As such, in at least one implementation, at least one of the primary first data signal or the primary second data signal is being oversampled. Determining the particular rate may also comprise determining a first sample rate that is sufficient to sample the first composite signal 110a and recover first signal data. The first signal data may comprise the primary first data signal. Additionally, the first sample rate may comprise a rate that is different than the Nyquist rate of the first composite signal 110a, yet still sufficient to recover the necessary first signal data.

Determining the particular rate may further comprise determining a second sample rate that is sufficient to sample the second constituent signal (i.e., primary second data signal) and recover second signal data. The second signal data may comprise the primary second data signal. Additionally, the second sample rate may comprise a rate that is different than the Nyquist rate of the primary second data signal, yet still sufficient to recover the necessary second signal data. In at least one implementation, the particular rate at which both the first composite signal 110a and the second composite signal 110b are sampled comprises a rate that is equal to, or higher than, the higher of the first sample rate and the second sample rate.

Additionally, in at least one implementation, if the primary second data signal only needs to be cancelled from the first composite signal, and not recovered, the particular rate can be less than the Nyquist rate of the primary second data signal (e.g, such as the Nyquist rate of the primary first data signal). In such a case, the primary second data signal may be aliased in both of the composite signals, but can be estimable in aliased form and removable from a similarly aliased composite signal. As such, in at least one implementation, it is not necessary to account for the Nyquist rate of the primary second data signal, when that signal is not going to be recovered.

In at least one implementation, the digital signal processing system 100 can feed the first composite signal 120a and the second composite signal 120b into a first digital phase shifter 130a. In at least one alternative implementation, where it is desired to recover the primary second data signal, the digital signal processing system 100 can also feed the second composite signal 120b and the first composite signal 120a into a second digital phase shifter 130b. The respective digital phase shifters 130(a, b) may align the frequency and phase of the respective input signals 122(a, b). In at least one implementation of the present invention, the first composite signal 110a and the second composite signal 110b may also be matched in time and/or amplitude. Additionally, in at least one implementation, the sample locations of the respective signals can be matched in time through interpolating respective samples of the first composite signal 110a and/or the second composite signal 110b. One of skill in the art will understand there are several known methods for matching phase, frequency, amplitude, and/or timing of received signals.

Additionally, in at least one implementation, a first resample process 140a within the digital signal processing system 100 can estimate from the second composite signal 110b an estimated cross-coupled second signal 142b within the first composite signal 110a. To make the determination, the first resample process 140a can determine the estimated cross-coupled second signal 142b from the second composite signal 110b while it is at the same sampling rate as the first composite signal 110a. As mentioned above, in at least one implementation, the first composite signal 110a and the second composite signal 110b are sampled and analyzed at the same rate, even though each respective signal may comprise a different frequency or chipping rate.

In at least one alternative implementation, where it is desired to recover the primary second data signal, a second resample process 140b within the digital signal processing system 100 can estimate from the first composite signal 110b an estimated cross-coupled first signal 142a within the second composite signal 110b. To make the determination, resample process 140b can determine the estimated cross-coupled first signal 142a from the first composite signal 110a while it is at the same sampling rate as the second composite signal 110b.

Once the estimated cross-coupled second signal 142b has been determined, the first cross polarization interference cancellation ("CPIC") process 150a can recover a substantially decoupled first data signal 152a by removing at least a portion of the co -channel interference caused by the estimated cross-coupled second signal 142b from the composite first signal 110a. Similarly, in at least one alternative implementation, where it is desired to recover the primary second data signal, once the estimated cross-coupled first signal 142a has been determined, the second cross polarization interference cancellation ("CPIC") process 150b can recover a substantially decoupled second data signal 152b by removing at least a portion of the co-channel interference caused by the estimated cross-coupled first signal 142a from the composite second signal 110b.

Additionally, in at least one implementation of the present invention, the digital signal processing system 100 can generate a recovered first data signal from the substantially decoupled first data signal 152a by estimating individual symbols within the substantially decoupled first data signal 152a. For example, assuming a known symbol-space, the digital signal processing system 100 can perform a nearest-fit analysis of each symbol within the substantially decoupled second data signal. Using any number of symbol recovery techniques known in the art, the digital signal processing system 100 can recover estimated symbols.

Using the recovered first data signal, the digital signal processing system 100 can calculate a first signal error based upon the difference between the recovered first data signal and the substantially decoupled first data signal 152a. The first signal error can then be used by the digital signal processing system 100 within a feedback system to adjust a first signal filter. In at least one implementation, before being used within a feedback system, the first signal error can be up-sampled to match the sampling rate of the first signal error with the particular sample rate. In at least one implementation, the first signal filter can comprise the first resample process 140a.

One will understand that the first signal filter may comprise an adaptive filter such as a least mean squares filter, a Kalman Filter, or any other adaptive filter known in the art. Additionally, in various implementations, a second error signal can be derived from the substantially decoupled second data signal 152b and estimated individual symbols within the substantially decoupled second data signal 152b. The calculated second error signal can also be used within a feedback loop for the second composite signal 110b.

Figure 2:
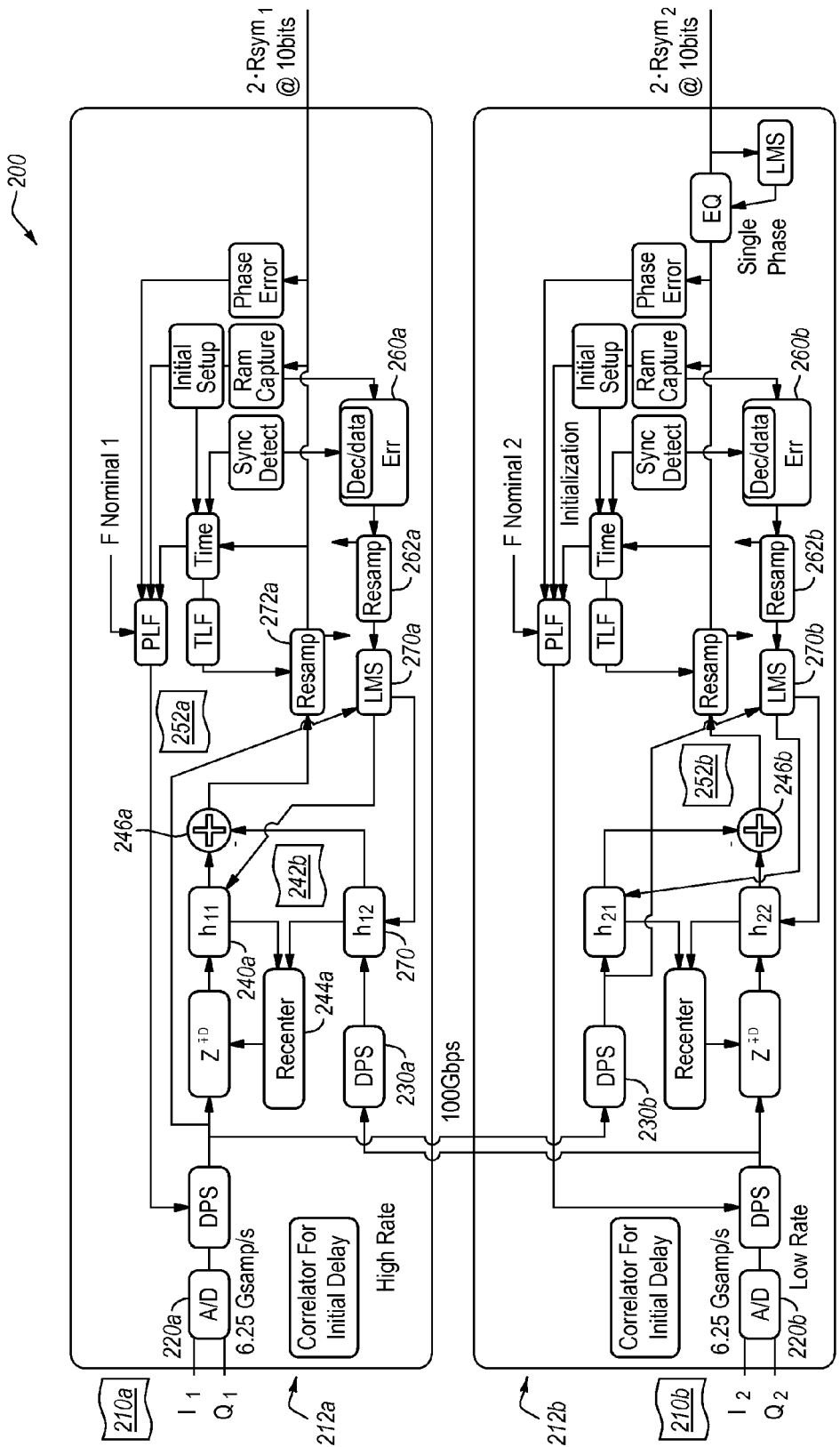
FIG. 2 illustrates another schematic diagram of a digital signal processing system in accordance with implementations of the present invention.

FIG. 2 depicts a schematic of an implementation of a digital signal processing system 200 that comprises one or more feedback loops. Similar to the digital signal processing system 100 of FIG. 1, the digital signal processing system 200 can comprise a first branch 212a, configured for receiving and analyzing a first composite signal 210a, and a second branch 212b, configured for receiving and analyzing a second composite signal 210b.

The first composite signal 210a can comprise a primary first data signal and a cross-coupled second signal. The primary first data signal may comprise the portion of the first composite signal 210a that contains the data of interest. In contrast, the cross-coupled second signal may comprise interference introduced by a primary second data signal of the second composite signal 210b into the first composite signal 210a through co-channel interference. In at least one implementation, the primary first data signal and the primary second data signal comprise different respective symbol and/or chipping rates.

Once the first composite signal 210a and the second composite signal 210b have been received, in at least one implementation, the digital signal processing system 200 can sample both signals at the same rate. For example, first and second analog-to-digital converters 220(a, b) can sample both respective composite signals 210(a, b) at the same particular rate. The particular rate may comprise a rate that is high enough to recover signal data from both the first composite signal and the second composite signal.

The below disclosure will primarily focus on the analysis of the first composite signal 210a within the first branch 212a, but one will understand that substantially parallel analysis can by performed within the second branch 212b regarding the second composite signal 210b. Additionally, in at least one implementation variations may occur between the first branch 212a and the second branch 212b. One or more of those variations are depicted in FIG. 2 and described further below.

In at least one implementation, the digital signal processing system 200 can feed the first composite signal 210a and the second composite signal 210b into a first digital phase shifter 230a within the first branch 212a. The first digital phase shifter 230a may align the frequency and phase of the respective input signals 122(a, b). In at least one implementation of the present invention, the first composite signal 110a and the second composite signal 110b may also be matched in time and/or amplitude. One of skill in the art will understand there are several known methods for matching phase, frequency, amplitude, and/or timing of received signals.

Additionally, a first filter process 240a within the first branch 212a can estimate from the second composite signal 210b an estimated cross-coupled second signal 242b within the first composite signal 210a. In at least one implementation, the first filter process 240a can determine the estimated cross-coupled second signal 242b from the second composite signal 210b while it is at the same sampling rate as the first composite signal 210a. Additionally, in at least one implementation, the digital signal processing system 200 can comprise a recenter process 244a that is configured to assist in recentering the first filter process 240a.

Once the estimated cross-coupled second signal 242b has been determined, the estimated cross-coupled second signal 242b can be subtracted 246a from the composite first signal 210a. The resulting signal may comprise a substantially decoupled first data signal 252a. In at least one implementation, the digital signal processing system 200 can generate a recovered first data signal from the substantially decoupled first data signal 252a by estimating individual symbols within the substantially decoupled first data signal 252a.

Using the recovered first data signal, an error calculation process 260a can calculate a first signal error based upon the difference between the recovered first data signal and the substantially decoupled first data signal 252a. The first signal error can then be used by the digital signal processing system 200 within a feedback system to adjust a first signal filter 240a. For example, the feedback system may comprise a first mean squares process 270a. In at least one implementation, before being used within a feedback system, the first signal error can be up-sampled by an up-sample process 262a to match the sampling rate of the first signal error with the particular sample rate of the composite first signal 210a.

As such, implementations of the present invention comprise adaptive filtering for removing co-channel interference. Additionally, implementations of the present invention can remove co-channel interference caused by signals of different rates. One of skill in the art will appreciate the unique problems that arise from co-channel signals having different rates.

Accordingly, FIGS. 1 and 2 and the corresponding text illustrate or otherwise describe one or more components, modules, and/or mechanisms for receiving and removing co-channel interference from one or more received signals that comprise different symbol or chipping rates. One will appreciate that implementations of the present invention can also be described in terms of methods comprising one or more acts for accomplishing a particular result. For example, FIGS. 3 and 4 and the corresponding text illustrate flowcharts of a sequence of acts in a method for receiving and removing co-channel interference from one or more received signals that comprise different symbol or chipping rates. The acts of FIGS. 3 and 4 are described below with reference to the components and modules illustrated in FIGS. 1 and 2.

Figure 3:
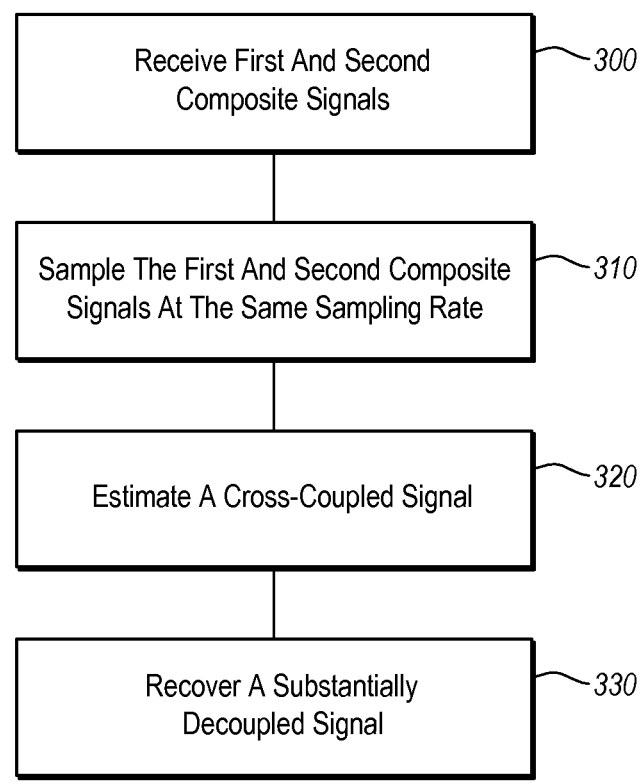
FIG. 3 illustrates a flowchart of a series of acts in a method in accordance with implementations of the present invention.
Figure 4:
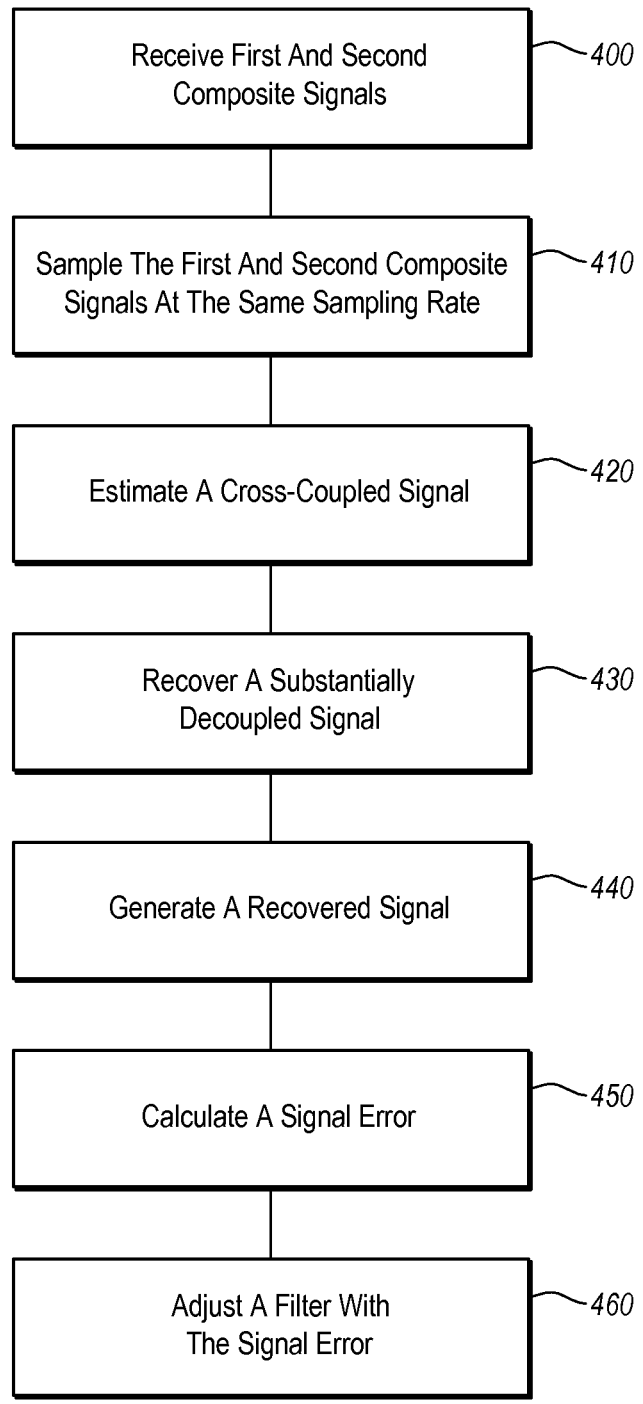
FIG. 4 illustrates a flowchart of a series of acts in a system in accordance with implementations of the present invention.

For example, FIG. 3 illustrates that a method for receiving and removing co-channel interference from one or more received signals that comprise different symbol or chipping rates can comprise an act 300 of receiving first and second composite signals. Act 300 includes receiving a first composite signal and a second composite signal, wherein the first composite signal comprises a primary first data signal and a cross-coupled second signal. The first composite signal and the second composite signal may also share the same frequency band causing co-channel interference; however, the first composite signal and the second composite signal may comprise different chipping or symbol rates. For example, in FIG. 1 and the accompanying description, a digital signal processing system 100 receives a first composite signal 110a and a second composite signal 110b. The respective signals may be transmitted at orthogonal polarizations within the same frequency band.

FIG. 3 also shows that the method can comprise an act 310 of sampling the first and second composite signals at the same sampling rate. Act 310 includes sampling the first composite signal and the second composite signal at a particular sampling rate that is sufficient to recover signal data from both the first composite signal and the second composite signal. For example, in FIG. 1 and the accompanying description, a first analog-to-digital converter 120a and a second analog-to-digital convert 120b sample the respective signals at the same rate. The sampling rate is determined based upon the higher of the respective rates required to recover signal data from the respective signals.

Additionally, FIG. 3 shows that the method can comprise an act 320 of estimating a cross-coupled signal. Act 320 can include estimating from the second composite signal an estimated cross-coupled second signal within the first composite signal. The estimated cross-coupled second signal may be estimated from at least the second composite signal at the particular sampling rate. For example, in FIG. 2 and the accompanying description, an LMS update algorithm can estimate a cross-coupled second signal and update filter 270 ("$h_{12}$") based upon the estimation.

Further, FIG. 3 shows that the method can comprise an act 330 of recovering a substantially decoupled signal. Act 330 can include recovering a substantially decoupled first data signal by removing at least a portion of the co-channel interference caused by the estimated cross-coupled second signal from the composite first signal. For example, in FIG. 2 and the accompanying description, once the estimated cross-coupled second signal 242b has been determined, the estimated cross-coupled second signal 242b can be subtracted 246a from the composite first signal 210a —resulting in a substantially decoupled first data signal 252a.

FIG. 4 illustrates an additional or alternative system for receiving and removing co-channel interference from one or more received signals that comprise different symbol or chipping rates can be configured to perform an act 400 of receiving first and second composite signals. Act 400 includes receiving a first composite signal and a second composite signal, wherein the first composite signal comprises a primary first data signal and a cross-coupled second signal. The first composite signal and the second composite signal may also share the same frequency band causing co-channel interference; however, the first composite signal and the second composite signal may comprise different chipping or symbol rates. For example, in FIG. 1 and the accompanying description, a digital signal processing system 100 receives a first composite signal 110a and a second composite signal 110b. The respective signals may be transmitted at orthogonal polarizations within the same frequency band.

FIG. 4 also shows that the system can be configured to perform an act 410 of sampling the first and second composite signals at the same sampling rate. Act 410 includes sampling the first composite signal and the second composite signal at a particular sampling rate that is sufficient to recover signal data from both the first composite signal and the second composite signal. For example, in FIG. 1 and the accompanying description, a first analog-to-digital convert 120a and a second analog-to-digital convert 120b sample the respective signals at the same rate. The sampling rate is determined based upon the higher of the respective rates required to recover signal data from the respective signals.

Additionally, FIG. 4 shows that the system can be configured to perform an act 420 of estimating a cross-coupled signal. Act 420 can include estimating from the second composite signal an estimated cross-coupled second signal within the first composite signal. The estimated cross-coupled second signal may be estimated from at least the second composite signal at the particular sampling rate. For example, in FIG. 2 and the accompanying description, filter 270 ("$H_{12}$") can be configured to estimate the co-channel interference caused by the second composite signal 210b within the first composite signal 210a.

FIG. 4 also shows that the system can be configured to perform an act 430 of recovering a substantially decoupled signal. Act 430 can include recovering a substantially decoupled first data signal by removing at least a portion of the co-channel interference caused by the estimated cross-coupled second signal from the composite first signal. For example, in FIG. 2 and the accompanying description, once the estimated cross-coupled second signal 242b has been determined, the estimated cross-coupled second signal 242b can be subtracted 246a from the composite first signal 210a —resulting in a substantially decoupled first data signal 252a.

In addition, FIG. 4 shows that the system can be configured to perform an act 440 of generating a recovered signal. Act 440 can include generating a recovered first data signal from the substantially decoupled first data signal by estimating individual symbols within the substantially decoupled first data signal. For example, in FIG. 2 and the accompanying description, substantially decoupled first data signal 252a can be used to generate recovered symbols. For example, resample process 272a can match each symbol within the substantially decoupled first data signal 252a to a nearest matched symbol within the known symbol space. In at least one embodiment, the estimated symbols may comprise more than one sample per estimated symbol. Alternatively, the digital signal processing system 200 can utilize prior knowledge of the symbols to identify the actual symbol values within the substantially decoupled first data signal 252a.

Further, FIG. 4 shows that the system can be configured to perform an act 450 of calculating a signal error. Act 450 can include calculating a first signal error based upon the difference between the recovered first data signal and the substantially decoupled first data signal. For example, in FIG. 2 and the accompanying description, error calculation process 260a can calculate a first signal error based upon the difference between a recovered first data signal and a substantially decoupled first data signal 252a.

Further still, FIG. 4 shows that the system can be configured to perform an act 460 of adjusting a filter with the signal error. Act 460 can include utilizing the first signal error within a feedback system to adjust a first signal filter. For example, in FIG. 2 and the accompanying description, the first signal error is utilized within a mean squares process 270a to provide feedback to a first filter 240a.

Accordingly, implementations of the present invention provide significant benefits and innovations within the field of digital signal processing. For example, implementations of the present invention provide methods and systems for digitally removing co-channel interference when the respective co-channel signals are at different symbol or chipping rates.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Additionally, various embodiments may utilize computers in the form of FPGAs, ASICs, or any other computation platform capable of digital signal processing. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computing system including one or more digital processing devices and system memory, a method for receiving and removing co-channel interference from one or more received signals that comprise different symbol or chipping rates, the method comprising:
   receiving a first composite signal and a second composite signal, wherein:
      the first composite signal comprises a primary first data signal and a cross-coupled second signal,
      the first composite signal and the second composite signal share the same frequency band causing co-channel interference, and
      the primary first data signal and a primary second data signal associated with the second composite signal comprise different chipping or symbol rates;
   sampling the first composite signal and the second composite signal at a particular sampling rate that is sufficient to recover signal data from both the first composite signal and the second composite signal;
   estimating from the second composite signal an estimated cross-coupled second signal within the first composite signal, wherein the estimated cross-coupled second signal is estimated from at least the second composite signal at the particular sampling rate; and
   recovering a substantially decoupled first data signal by removing at least a portion of the co-channel interference caused by the estimated cross-coupled second signal from the first composite signal.

2. The method as recited in claim 1, further comprising:
   determining a first sample rate that is sufficient to sample the first composite signal and recover first signal data; and
   determining a second sample rate that is sufficient to sample the second composite signal and recover second signal data;
   wherein the particular sample rate is equal to or higher than the higher of the second sample rate and the first sample rate.

3. The method as recited claim 2, wherein the first sample rate is the Nyquist rate of the first data signal.

4. The method as recited claim 2, wherein the second sample rate is the Nyquist rate of a second data signal within the second composite signal.

5. The method as recited claim 2, wherein, when the second data signal is not being recovered, the second sample rate is less than the Nyquist rate of a second data signal within the second composite signal.

6. The method as recited in claim 5, wherein the second data signal is sampled at the Nyquist rate of the first data signal.

7. The method as recited in claim 1, further comprising:
   estimating from the first composite signal an estimated cross-coupled first signal within the second composite signal, wherein the estimated cross-coupled first signal is estimated from at least the first composite signal at the particular sampling rate; and
   recovering a substantially decoupled second data signal by removing at least a portion of the co-channel interference caused by the estimated cross-coupled first signal from the second composite signal.

8. The method as recited in claim 1, further comprising:
   matching, in time and amplitude, samples of the first composite signal and samples of the second composite signal.

9. The method as recited in claim 1, wherein the first composite signal and the second composite signal comprise digital signals.

10. The method as recited in claim 1, further comprising:
    generating a recovered first data signal from the substantially decoupled first data signal by estimating individual symbols within the substantially decoupled first data signal;
    calculating a first signal error based upon the difference between the recovered first data signal and the substantially decoupled first data signal; and
    utilizing the first signal error within a feedback system to adjust a first signal filter.

11. The method as recited in claim 10, further comprising up-sampling the first signal error to match the sampling rate of the first signal error with the particular sample rate.

12. A computer system, comprising:
    one or more processors;
    system memory; and
    one or more computer-readable media storing computer-executable instructions that are executable by the one or more processors, and that configure the system to remove co-channel interference from one or more received signals that comprise different symbol or chipping rates, including computer-executable instructions that configure the computer system to perform at least the following:
       receive a first composite signal and a second composite signal, wherein:
          the first composite signal comprises a primary first data signal and a cross-coupled second signal,
          the first composite signal and the second composite signal share the same frequency band, and
          the primary first data signal and a primary second data signal associated with the second composite signal comprise different chipping or symbol rates;
       sample the first composite signal and the second composite signal at a particular sampling rate that is sufficient to recover signal data from both of the first composite signal and the second composite signal;
       estimate from the second composite signal an estimated cross -coupled second signal within the first composite signal, wherein the estimated cross-coupled second signal is estimated from at least the second composite signal at the particular sampling rate;
       recover a substantially decoupled first data signal by removing at least a portion of the co-channel interference caused by the estimated cross-coupled second signal from the first composite signal;
       generate a recovered first data signal from the substantially decoupled first data signal by estimating individual symbols within the substantially decoupled first data signal;
       calculate a first signal error based upon the difference between the recovered first data signal and the substantially decoupled first data signal; and utilize the first signal error within a feedback system to adjust a first signal filter.

13. The system as recited in claim 12, further configured to:
estimate from the first composite signal an estimated cross-coupled first signal within the second composite signal, wherein the estimated cross-coupled first signal is estimated from at least the first composite signal at the particular sampling rate; and
recover a substantially decoupled second data signal by removing at least a portion of the co-channel interference caused by the estimated cross-coupled first signal from the second composite signal.

14. The system as recited in claim 13, further configured to:
generate a recovered second data signal from the substantially decoupled second data signal by estimating individual symbols within the substantially decoupled second data signal;
calculate a second signal error based upon the difference between the recovered second data signal and the substantially decoupled second data signal; and
utilize the second signal error within a feedback system to adjust a second signal filter.

15. The system as recited in claim 12, wherein the first signal filter is used to generate the recovered first data signal from the first composite signal.

16. The system as recited in claim 12, further configured to align, in time and amplitude, samples of the first composite signal and samples of the second composite signal.

17. The system as recited in claim 12, further configured to up-sample the first signal error to match the sampling rate of the first signal error with the particular sample rate.

18. The system as recited in claim 12, wherein the first composite signal and the second composite signal comprise digital signals.

19. The system as recited in claim 12, wherein the first signal error comprises a different sample rate than the first composite signal.

20. The system as recited in claim 12, wherein the first composite signal comprises a vertical polarization and the second composite signal comprises a horizontal polarization.

21. The system as recited in claim 12, wherein the first composite signal is received by a first directional antenna and the second composite signal is received by a second directional antenna that is receiving from a different direction than the first directional antenna.

22. A computer program product comprising one or more computer storage media having stored thereon computer-executable instructions that, when executed at a processor, cause the computer system to perform a method for receiving and filtering coupled signals that comprise different symbol or chipping rates, the method comprising:
receiving a first composite signal and a second composite signal, wherein:
the first composite signal comprises a primary first data signal and a cross-coupled second signal,
the first composite signal and the second composite signal share the same frequency band, and
the primary first data signal and a primary second data signal associated with the second composite signal comprise different chipping or symbol rates;
sampling the first composite signal and the second composite signal at a particular sampling rate that is sufficient to recover signal data from both the first composite signal and the second composite signal;
estimating from the second composite signal an estimated cross-coupled second signal within the first composite signal, wherein the estimated cross -coupled second signal is estimated from at least the second composite signal at the particular sampling rate; and
recovering a substantially decoupled first data signal by removing at least a portion of the co-channel interference caused by the estimated cross-coupled second signal from the first composite signal.

\* \* \* \* \*